US011159628B1

(12) United States Patent
Gupta et al.

(10) Patent No.: US 11,159,628 B1
(45) Date of Patent: Oct. 26, 2021

(54) EDGE INTELLIGENCE-BASED RESOURCE MODIFICATION FOR TRANSMITTING DATA STREAMS TO A PROVIDER NETWORK

(71) Applicant: Amazon Technologies, Inc., Seattle, WA (US)

(72) Inventors: Gaurav Gupta, Sammamish, WA (US); Kamal Garg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,097

(22) Filed: Mar. 30, 2020

(51) Int. Cl.
| | |
|---|---|
| G06F 15/16 | (2006.01) |
| H04L 29/08 | (2006.01) |
| G06N 20/00 | (2019.01) |
| H04L 29/06 | (2006.01) |
| H04W 84/04 | (2009.01) |

(52) U.S. Cl.
CPC ............ *H04L 67/16* (2013.01); *G06N 20/00* (2019.01); *H04L 65/60* (2013.01); *H04L 65/80* (2013.01); *H04L 67/34* (2013.01); *H04W 84/04* (2013.01)

(58) Field of Classification Search
CPC ......... H04L 67/16; H04L 65/60; H04L 65/80; H04L 67/34; H04W 84/04
See application file for complete search history.

(56) References Cited

U.S. PATENT DOCUMENTS

| | | | | |
|---|---|---|---|---|
| 7,747,701 | B2 * | 6/2010 | Yang | H04L 65/80 709/219 |
| 7,953,865 | B1 * | 5/2011 | Miller | H04L 29/06 709/227 |
| 8,856,289 | B2 * | 10/2014 | Ansari | G05B 19/042 709/220 |
| 9,654,357 | B2 | 5/2017 | Fox et al. | |
| 10,007,513 | B2 | 6/2018 | Malladi et al. | |
| 2003/0033379 | A1 * | 2/2003 | Civanlar | H04L 41/5054 709/218 |
| 2006/0142876 | A1 * | 6/2006 | Kalhoff | H04W 4/02 700/11 |
| 2006/0259604 | A1 * | 11/2006 | Kotchavi | H04L 41/082 709/223 |
| 2008/0109537 | A1 * | 5/2008 | Aune | H04L 67/04 709/220 |

(Continued)

Primary Examiner — Razu A Miah
(74) Attorney, Agent, or Firm — Robert C. Kowert; Kowert, Hood, Munyon, Rankin & Goetzel, P.C.

(57) ABSTRACT

A trained model and/or an edge client running on an edge device may obtain data from a data source (e.g., a security video camera) and determine, based on a result of processing the data using the model, whether to send an indication of an upcoming data/video stream to the provider network (e.g., indicating a bearer modification). The received indication may be used by the provider network to send a request to a serving wireless infrastructure (e.g., telco operator/wireless mobile core) for configuration of one or more resources on behalf of the edge device to process the upcoming data stream. The received indication may be used by the provider network in order to configure one or more resources at the provider network to process the upcoming data stream. The edge device initiates transmission of the data stream from the data source to the provider network via the serving wireless infrastructure.

20 Claims, 11 Drawing Sheets

(56) References Cited

U.S. PATENT DOCUMENTS

| | | | | |
|---|---|---|---|---|
| 2009/0252063 | A1* | 10/2009 | Owen | H04L 67/34 370/255 |
| 2010/0198977 | A1* | 8/2010 | Shetty | H04N 21/222 709/231 |
| 2010/0235433 | A1* | 9/2010 | Ansari | H04L 12/2818 709/203 |
| 2012/0023212 | A1* | 1/2012 | Roth | H04W 8/005 709/223 |
| 2012/0324067 | A1* | 12/2012 | Hari | H04M 1/72406 709/222 |
| 2013/0282916 | A1* | 10/2013 | Carter | H04L 43/50 709/231 |
| 2014/0052812 | A1* | 2/2014 | Ozawa | H04L 67/2852 709/213 |
| 2015/0281299 | A1* | 10/2015 | Moustafa | H04L 65/4084 709/219 |
| 2017/0060574 | A1* | 3/2017 | Malladi | G06F 9/542 |

* cited by examiner

EDGE INTELLIGENCE-BASED RESOURCE MODIFICATION FOR TRANSMITTING DATA STREAMS TO A PROVIDER NETWORK

BACKGROUND

The demand for transmission and processing of data streams continues to grow as individuals and organizations take advantage of the capabilities offered by communication providers (e.g., internet providers, telco operators) and web service providers (e.g., via provider networks that provide "cloud" computing). For example, the global video surveillance industry uses these technologies to provide video monitoring and security services, and this industry is expected to grow significantly in the coming years.

As wireless standards (e.g., 3G, 4G, 5G) and technologies continue to evolve, the processing of data streams (e.g., time-encoded data such as visual data and/or non-visual data—radar, mm wave, etc.) by wireless infrastructures and cloud companies to connect next-generation edge devices (e.g., internet of things (IoT) devices) with IP mobility networks can introduce complex and challenging problems. Therefore, it can be difficult to develop a next-generation (4G, 5G, etc.) enabled framework that provides a desired time to respond (e.g., to meet expectations of low latency) and that also efficiently implements the routing/processing of data streams (e.g., video and/or other time-encoded data) that introduce a much higher demand for bandwidth, storage, and analytics capability.

Figure 1:
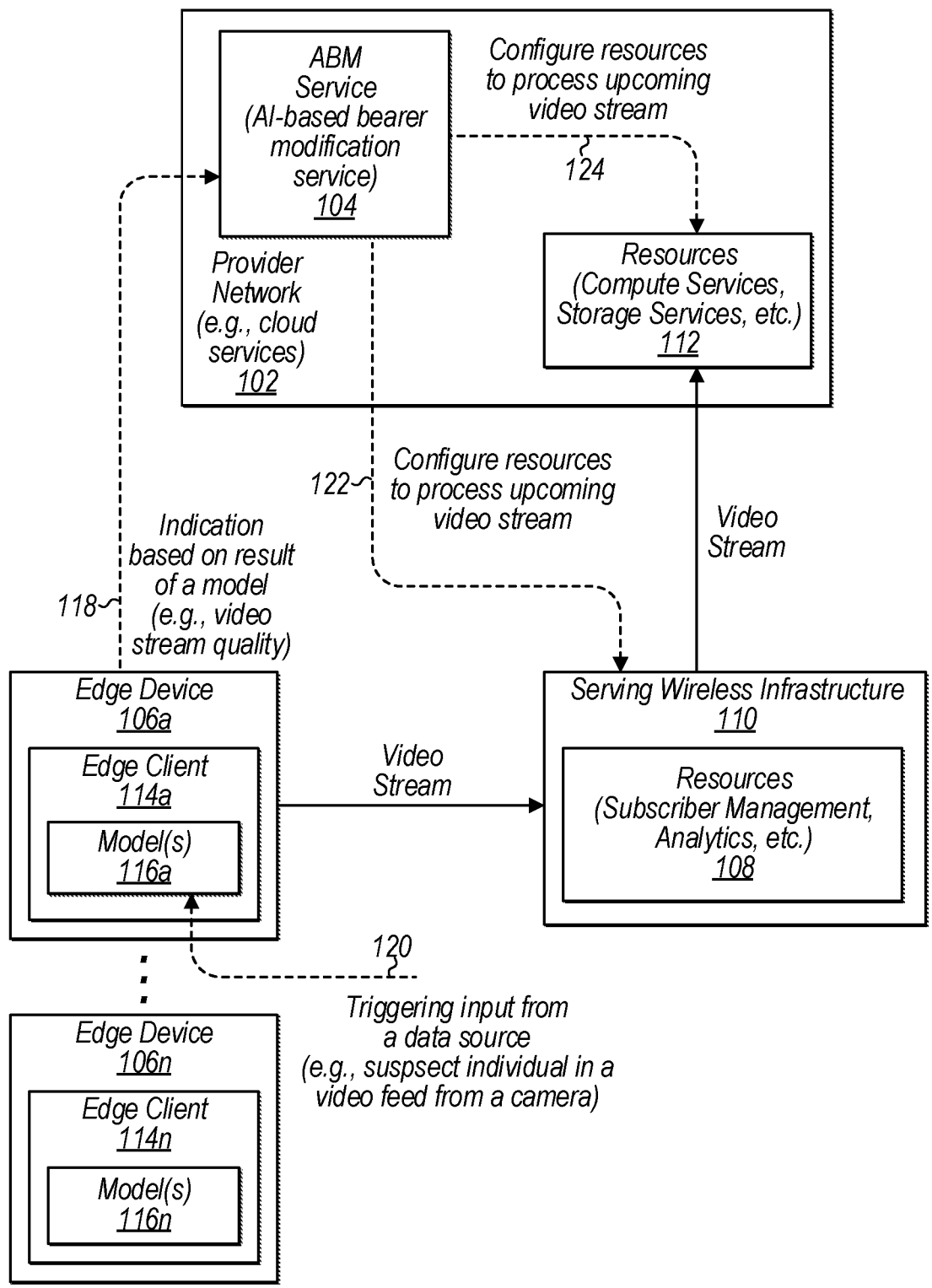
FIG. 1 is a logical block diagram illustrating a system for edge intelligence-based resource modification for transmitting data streams to a provider network, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement edge intelligence-based resource modification for transmitting data streams to a provider network, according to some embodiments. In embodiments, using edge intelligence-based resource modification for transmitting data streams to a provider network may optimize usage of the wireless spectrum and provider network resources by reducing the amount of unnecessary data stream transmissions from data sources (e.g., video cameras or microphones) to a provider network, which may also reduce the amount of compute/storage resources used.

Embodiments described herein may result in cost savings for a provider network, its clients, and a telco operator (e.g., a cellular carrier) that provides a serving wireless infrastructures for transmission of data streams (due to reduced bandwidth usage, reduced resource usage, etc.). As used herein, the term "provider network" refers to a cloud and/or edge infrastructure of a service provider (e.g., provider of the ABM service and/or other services to clients as discussed herein), and is different than the serving wireless infrastructure of a telco operator (e.g., the carrier that provides wireless/cellular-related functions to transmit data streams on behalf of edge devices, such as subscriber management, analytics, etc.).

In embodiments, a trained model and/or an edge client running on an edge device may obtain data from a data source (e.g., a security video camera) and determine, based on a result of processing the data using the model, whether to send an indication of an upcoming data stream to the provider network (e.g., indicating a bearer modification). In embodiments, the indication may be used by the provider network to send a request to a serving wireless infrastructure (e.g., a wireless mobile core or other data stream-processing infrastructure/network of a telco operator that provides wireless/cellular-related functions to transmit data on behalf of subscribing edge devices using one or more licensed and/or unlicensed frequencies) for configuration of one or more resources on behalf of the edge device.

In some embodiments, the indication may be used by the provider network in order to configure one or more resources at the provider network (instead of or in addition to sending a request to configure a serving wireless infrastructure). In some embodiments, the indication may be used by the provider network in order to cause an edge device/data source device to be configured (e.g., to transmit a data stream at a particular quality level). After the resources of the serving wireless infrastructure and/or provider network and/or the edge device/data source device are configured, the edge device may initiate transmission of the data stream from the data source to the provider network via the serving wireless infrastructure.

As an example, detection of a cat (non-suspect object or animal) using a model for video data processing may not trigger the edge device to send an indication to the provider network of an upcoming video stream, but detection of a person as a possible intruder (suspect individual) may trigger the edge device to send an indication of an upcoming video stream (e.g., indicating a bearer modification to transmit/process the video stream). Based on the received indication, the provider network may cause various video stream-processing resources (e.g., analytics and compute resources of the provider network and/or a serving wireless infrastructure) to be configured in order to process the upcoming video stream.

Although video data and other types of data are discussed herein, in various embodiments any other type of data may be generated by any type of sensor, processed by one or more models, and/or transmitted as a data stream. For example, the time-encoded data of a data stream may include video, audio, light detection and ranging (LIDAR), millimeter wave, thermal, infrared, or any other visual and/or non-visual data. As used herein with respect to a video stream, to "detect" an object/subject may be equivalent to identifying (e.g., using object recognition) an object/subject in the video stream. In embodiments, object recognition refers to a collection of one or more computer vision tasks (e.g. classification, detection, segmentation, localization, etc.) implemented by one or more models (e.g., using data of a video stream as input) to identify one or more objects, persons, faces and/or other items of relevance in a data stream (e.g., video stream). For example, a model may detect (identify) a suspect individual by implementing one or more tasks to analyze/process data of a video stream provided by a video camera.

In embodiments, a model running on an edge device may obtain data from any number/type of data sources to process and generate a result. For example, a model may obtain the data from any number of different video cameras and/or microphones, process the video and/or audio data, and generate a result. Thus, the input data may represent a fusion or combination of any number and any type of data sources/sensors.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 11 and described below.

This specification begins with a description of using edge intelligence-based resource modification for transmitting data streams to a provider network. A number of different methods and techniques to implement edge intelligence-based resource modification for transmitting data streams to a provider network are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for edge intelligence-based resource modification for transmitting data streams to a provider network, according to some embodiments.

In the depicted embodiment, a provider network 102 includes an artificial-intelligence based bearer modification (ABM) service 104 that implements edge intelligence-based resource modification for transmitting data streams to the provider network. Based on receiving an indication from an edge device 106, the ABM service may modify (e.g., configure) resources 108 of a serving wireless infrastructure 110 and/or resources 112 of the provider network 102.

In the example embodiment, the serving wireless infrastructure 110 is remotely located from the provider network 102 and from the edge devices 106 (e.g., in a local (e.g., private) network of a telco operator separate from a local network of the provider network), and may communicate with the provider network (or edge devices) via a wide-area network (e.g., the Internet). Similarly, the edge devices 106 are remotely located from the provider network 102 and the serving wireless infrastructure 110 (e.g., in a local network of a client (e.g., client of the provider network and/or telco operator) and may communicate with the provider network (or the serving wireless infrastructure) via the wide-area network (e.g., the Internet).

In various embodiments, at least some of the provider network 102 may include and/or control one or more components within/hosted by the serving wireless infrastructure 110. Similarly, at least some of the serving wireless infrastructure 110 may include and/or control one or more components within/hosted by the provider network 102. In some embodiments, at least some components/portions of the serving wireless infrastructure 110 may be considered part of the provider network (and vice-versa). Therefore, in various embodiments, any of the data transport functions and/or data processing functions described herein that are performed by the provider network may instead be performed by the serving wireless infrastructure (and vice-versa).

Although hardware/software components controlled by the provider network may be physically located at a site/data center of the serving wireless infrastructure, those hardware/software components may be considered as part of the provider network (e.g., part of the same logical provider network that includes components physically located at the site/data centers of the provider network and the serving wireless infrastructure). Similarly, even though hardware/software components controlled by the serving wireless infrastructure may be physically located at a site/data center of the provider network, those hardware/software components may be considered as part of the serving wireless infrastructure (e.g., part of the same logical network of the serving wireless infrastructure that includes components physically located at the site/data centers of the serving wireless infrastructure and the provider network).

In the depicted embodiment, a given edge device 106 may include an edge client 114. The edge client may include any number of data processing models 116. In embodiments, any number of the models 116 may be trained by the provider network and/or provided by the provider network. For example, the ABM service may cause the provider network to deploy/send models to an edge device. As depicted, there may be any number of edge devices 106. Furthermore, any number of clients of the provider network may use the ABM service, each with any number of their own edge devices. For example, one client may have local network that includes 100 different edge devices, another client may have a local network that includes 2000 different edge devices, and another client may client may have just one stand-alone edge device (e.g., a mobile device such as a smart phone).

In embodiments, a given model of an edge device (e.g., a model 116a) may trigger the sending of an indication 118 of an upcoming data stream to the provider network. For example, the model may obtain video data (e.g., triggering input 120) received from sensor(s) of a video camera and process the obtained data by a trained model to generate a result (e.g., a classification of a detected object based on at least a portion of the video data).

In embodiments, a result of a model may be a prediction based on data processed by the model. For example, a model may generate a prediction that a detected object/subject is a cat (e.g., instead of a dog or a person). In embodiments, the prediction may include a confidence level or accuracy assigned to the prediction. For example, the model may predict an object is a cat and assign a confidence level or accuracy of 95%, indicating a relatively high level of confidence in the prediction. In some embodiments, a prediction may be an event or an event that will happen in the future. For example, based on analyzing a video stream, a model may predict, with 90% accuracy, that a car will hit another car (e.g., based on identifying each car and analyzing the location and speed of each car).

In some embodiments, the edge device may determine, based on the result, whether to send an indication 118 of an upcoming data stream to the provider network. If the result indicates that a suspect individual was detected by the model (e.g., at least a portion of the data was classified by the model as a suspect individual), then the edge device may determine, based on application of one or more rules, to generate an indication of an upcoming data stream and send it to the ABM service. If the result indicates that a non-suspect individual or animal was detected by the model (e.g., at least a portion of the data was classified by the model as a non-suspect individual or animal), then the edge device may determine, based on application of the one or more rules, not to generate an indication of an upcoming data stream. Thus, the model may apply any number of rules for any number of model results (e.g., different subjects/objects, etc.) in order to determine whether to generate an indication of an upcoming data stream (and one or more parameters of the data stream, such as quality).

In various embodiments, the indication may include a quality of the upcoming data/video stream (e.g., quality of service or QoS), a configuration of one or more resources of the provider network or the serving wireless infrastructure to process the data stream, and/or an identifier for the edge device. In some embodiments, the quality of the data stream may specify a frame rate (e.g., number of frames per second or fps), a type of data encoding used, an amount of packet loss, latency/delay, or jitter that may tolerated (between the data source/edge device and the provider network/destination service), bandwidth available for transmission, an amount/type of compression codec (e.g., H264), resolution (e.g., HD, 4K, 8K), etc. In embodiments, the one or more rules may be provided to the edge device as part of the model or provided separately for use with the model.

Based on the indication received from the edge device, the ABM service may send, to an interface (e.g., an application programming interface (API)) of a serving wireless infrastructure), a request 122 to configure one or more resources of the serving wireless infrastructure (e.g., analytics, subscriber management, etc.) on behalf of the edge device in order to transmit a data stream (e.g., video stream) from the data source to the provider network via the serving wireless infrastructure. In embodiments, to transmit the data stream from the data source device to the provider network, the data stream may be received from the data source at the edge device and transmitted from the edge device to the provider network via the serving wireless infrastructure. In some embodiments, the data source itself (e.g., the video camera) may directly transmit the data stream to the provider network via the serving wireless infrastructure (e.g., without going through the edge device, by using a transmitter of the video camera itself).

In some embodiments, based on the indication received from the edge device, the ABM service may configure 124 one or more resources of the provider network (e.g., compute, storage, etc.) to process the data stream. In embodiments, the ABM service may determine, based on the indication from the edge device, a quality of the data stream to be transmitted (e.g., QoS) and configure one or more resources of the provider network (and/or the wireless infrastructure) to process the data stream according to the determined quality.

In some embodiments, the ABM service may also send another indication to the edge device or the data source, wherein the other indication causes the data source to transmit the data stream according to the determined quality. For example, the other indication may include an instruction, command, and/or other data that the edge device or data source uses in order to configure the data source to transmit the data stream according to the determined quality (e.g., at a particular frame rate, resolution, and/or compression type/level). For example, the configuration/mode of the data source by be changed from lower quality transmission (e.g., lower frame rate and/or lower resolution) to higher quality transmission (e.g., higher frame rate and/or higher resolution).

This may allow a provider network (e.g., via the ABM service) to coordinate various aspects of the data stream transmission (e.g., quality, timing, etc.) from any number of data sources by controlling edge devices/data source device as well as the data transmission resources at the telco operator's network (the serving wireless infrastructure). For example, the ABM service may determine, based on a particular license plate number that was detected, that the car is flagged as stolen (e.g., based on a database at the provider network). In response, the ABM service may send an indication to the edge device or the video camera to cause the video camera to transmit the video stream according to a higher frame rate and/or resolution than the currently configured frame rate and/or resolution. This may allow the ABM service and/or the edge device model to perform facial recognition on the driver and/or passengers in order to identify who is in the stolen car. Moreover, the ABM service may configure other nearby cameras (e.g., within a threshold distance of the video camera or on the same street) to provide additional video streams at the higher frame rate and/or resolution.

After the resources of the provider network and/or the serving wireless infrastructure are configured to process the upcoming data stream based on the indication (e.g., according to the level of quality and/or any other parameters for the data stream provided by the indication).

If the result indicates that a non-suspect individual or non-suspect animal/object was detected by the model, then the edge device may determine, based on application of the one or more rules, not to generate an indication of an upcoming data stream because the client does not have a desire to use or record non-suspect individuals/objects. This may reduce usage of resources of the client, the provider network, and/or the wireless infrastructure, resulting in reduced costs for transmission of data and increased life of transmission/storage equipment.

In embodiments, the result of the model may be transmitted to the provider network (e.g., without applying any rules). In this case, the provider network may generate, based on application of one or more rules assigned to the model (e.g., the rules are stored/known to the ABM service), an indication of an upcoming data stream to be transmitted from the edge device. In this embodiment, less bandwidth may be used because only the result of the model is transmitted (e.g., a single digit such as "1" or "7" that indicate different levels of transmission quality). As mentioned above, in various embodiments the indication may include a quality of the upcoming data/video stream (e.g., quality of service or QoS), a configuration of one or more resources of the provider network and/or the serving wireless infrastructure to process the data stream, and/or an identifier for the edge device. In some embodiments, the configuration of the resources of the provider network and/or serving wireless infrastructure may include a type of resource, identification of one or more resources, a number of resources/service instances to instantiate (e.g., ingestion instances, storage instances), and/or any other number of parameters used by the provider network and/or serving wireless infrastructure to configure resources.

As mentioned above, based on the generated indication, the ABM service may then send, to an interface of a serving wireless infrastructure, a request to configure one or more resources of the serving wireless infrastructure on behalf of the edge device in order to transmit a data stream from the data source to the provider network via the serving wireless infrastructure and/or configure one or more resources of the provider network. The ABM service may determine, based on the generated indication from the edge device, a quality of the data stream to be transmitted (e.g., QoS) and configure one or more resources of the provider network (and/or the wireless infrastructure) to process the data stream according to the determined quality. After the resources of the provider network and/or the serving wireless infrastructure are configured to process the upcoming data stream based on the indication (e.g., according to the level of quality and/or any other parameters for the data stream provided by the indication), the data source may begin transmitting the data stream.

In embodiments, an edge device/data source may no longer be collecting data that is of interest to a client and therefore the transmission of the data stream may terminated. For example, the edge device determine, based on a result of a model, that a suspect individual is no longer detected in a video feed and therefore the edge device may send an indication to the ABM service that includes the result of the model and/or instructs the ABM service to terminate the transmission of the data stream and/or release one or more of the resources of the serving wireless infrastructure and/or the provider network that are being used for transmission of the data stream.

In some embodiments, the ABM service may receive, from the edge device, another indication based on another result generated by the trained model. Based on the other indication, the ABM service may send, to the interface of the serving wireless infrastructure, another request to release one or more resources of the serving wireless infrastructure, so they become available to be configured for transmission of other data streams. The ABM service may also release on or more resources of the provider network, so they become available to be configured for processing of other data streams.

Figure 2A:
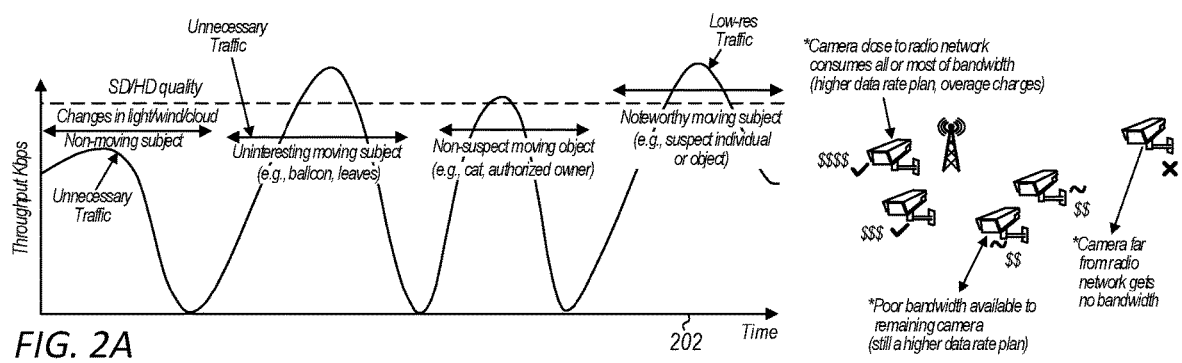
FIG. 2A is a logical block diagram illustrating throughput for transmission of a video stream over a period of time.

FIG. 2A is a logical block diagram illustrating throughput for transmission of a video stream over a period of time. In this example, a video camera capable of SD/HD quality transmission is shown. However, any other type of camera with any other quality capability may be used.

As shown, the video camera at a client's network/site captures data (e.g., images and/or audio data) over a period of time 202. The video camera may transmit video data to a destination for storage and/or analysis (e.g., to a web service provider) that may not be desired or needed by the client. For example, the video camera may detect changes in light or movement of a cloud, balloon, leaves, animals, or an authorized person/owner of the camera and transmit the corresponding video data, even though the client may have no desire to obtain, store, or analyze such data.

The video camera in this example may detect a suspect individual or object and transmit the corresponding video data. However, since the video camera is not used in as part of a system for edge intelligence-based resource modification, a large amount of unnecessary or unwanted video transmission occurs, resulting in unnecessary usage or waste of various transmission, storage, and/or other resources. For example, some cameras close to a radio network may consume all or most of the bandwidth available to the client, which may result in a higher data rate plan and/or overage charges for unnecessary and/or unwanted video transmission. Furthermore, this may result in other cameras (e.g., further away from the radio/cellular network) having little or no bandwidth available for transmission.

Figure 2B:
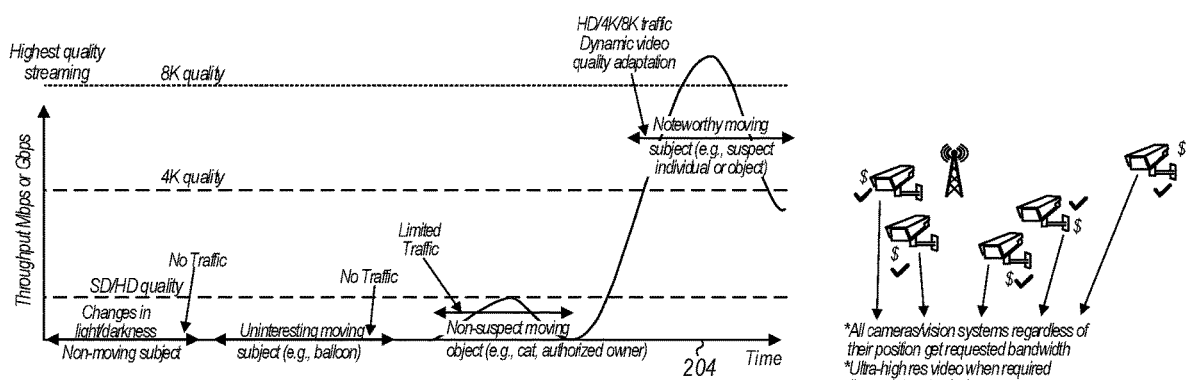
FIG. 2B is a logical block diagram illustrating throughput for transmission of a video stream over a period of time in a system using edge intelligence-based resource modification, according to some embodiments.

FIG. 2B is a logical block diagram illustrating throughput for transmission of a video stream over a period of time in a system using edge intelligence-based resource modification, according to some embodiments. In the example embodiment, a video camera capable of SD/HD quality transmission or HD/4K/8K quality transmission (with dynamic video quality adaptation) is shown. However, in various embodiments, any other type of camera with any other quality capability may be used.

In the example embodiment, an edge device (e.g., edge device 106) includes the video camera or the edge device may communicate with the video camera (e.g., via wired or wireless communication) so that the edge device obtains video data and processes the video data (e.g., by a model 116). As shown, the video camera at a client's network/site captures data (e.g., images and/or audio data) over a period of time 204. A model may obtain video data corresponding to changes in light or movement of a cloud, balloon, leaves, animals, or an authorized person/owner of the camera. As described herein, the detection of any of the above may result in no (or lower quality such as SD/HD) transmission of video data to a provider network (e.g., using one or more rules for lighting or objects/individuals classified as non-suspect) because the client may have no desire to store and/or analyze this classification of data. As described herein, this avoids unnecessary usage of resources.

As shown, the model may obtain video data corresponding to a suspect individual or object and transmit the corresponding video data. As described herein, the detection of a suspect individual or object may result in transmission of higher quality (e.g., HD/4K/8K) video data to the provider network (e.g., using one or more rules for objects/individuals classified as suspect individuals or objects) because the client may have a desire to store and/or analyze this classification of data using the higher quality video data. As depicted, the cameras may consume less bandwidth due to implementing edge intelligence-based resource modification, which may result a lower data rate plan because the client avoids unwanted video transmissions. As shown, this may result in multiple cameras having access to more available bandwidth (e.g., cameras will get their requested bandwidth, regardless of their location with respect to the radio/cellular network).

Figure 3:
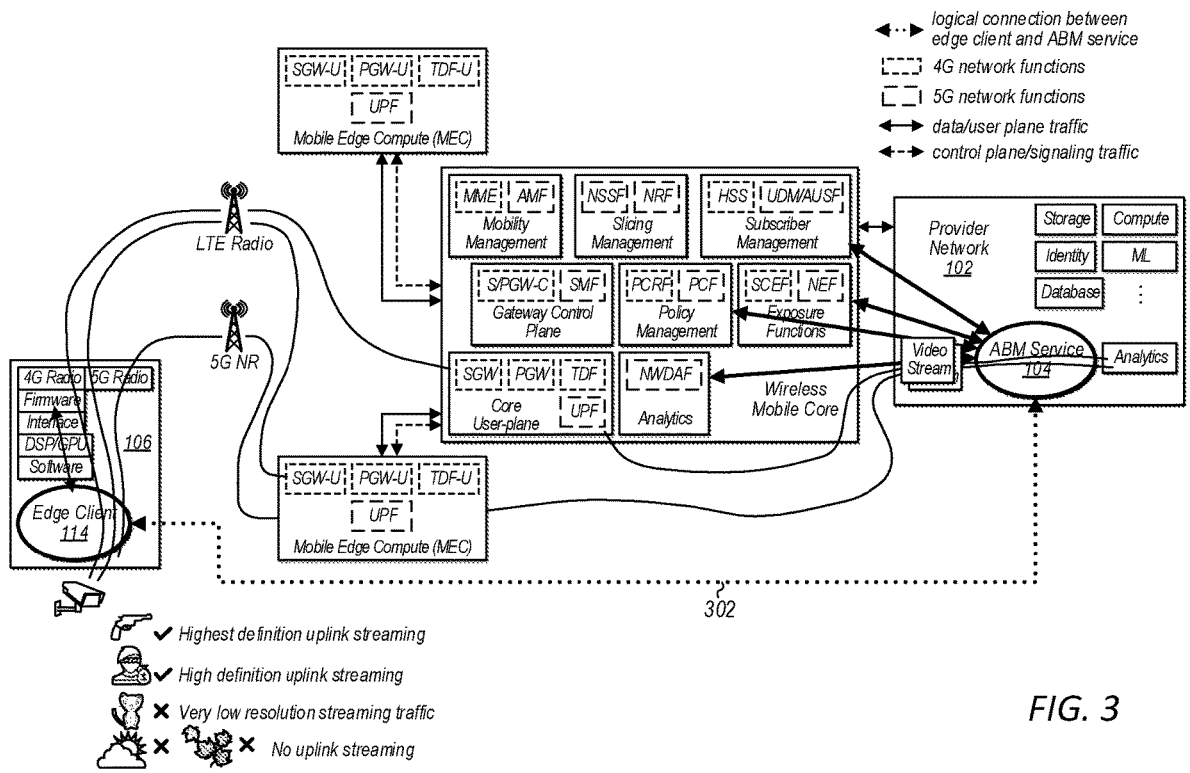
FIG. 3 is a logical block diagram illustrating a system for edge intelligence-based resource modification for transmitting data streams to a provider network, according to some embodiments.

FIG. 3 is a logical block diagram illustrating a system for edge intelligence-based resource modification for transmitting data streams to a provider network, according to some embodiments.

As depicted, a provider network (e.g., provider network 102) includes an ABM service (ABM service 104), as well as various other services that may be used to process data streams. For example, a video stream service may receive and perform initial processing of a video stream and analytics service may perform various types of analysis on the video stream. A machine learning (ML) service may be used to train models to be deployed to edge devices (e.g., edge device 106). An identity service may be used to authorize a client and/or edge devices of a client in order to establish a connection with the provider network and/or to use any particular service of the provider network. The provider network may include database resources, other storage resources, compute resources, and/or any other type of data/video stream-processing resource. Any of the above resources/services may be configured based on the indication from the edge device, as described herein.

In the example embodiment, a wireless infrastructure (e.g., wireless infrastructure 110) includes a "wireless mobile core" and any number of "mobile edge compute" networks. The edge client 114/edge device 106 may communicate 302 with the ABM service/provider network for various configuration/control-related functions as described herein (e.g., via a wide area network (e.g., the Internet) and/or other technique), without using the wireless infrastructure. For example, the edge device may send an indication of an upcoming video stream (e.g., bearer modification) to the ABM service. As shown, the communication 302 is a made using a "logical" connection between edge client and ABM service. In other words, the edge client/edge device may communicate 302 through one or more physical pathways using resources of a telco operator (e.g., serving wireless infrastructure 110) and/or other Internet resources.

As shown, the edge device includes the edge client, a 4G radio, a 5G radio, firmware, inference (e.g., one or more trained models), a DSP/GPU, and various other type of software. In embodiments, if a model detects/classifies a person with a dangerous weapon, then a rule(s) may cause a highest (or higher) definition video stream to be transmitted from the edge device to the ABM service via the wireless infrastructure. For example, as described herein, in response to the detection, the edge client/model may send an indication (e.g., communicate 302) to cause the ABM service to configure one or more resources of the wireless infrastructure and/or provider network to process the upcoming data stream according to the highest (or higher) definition quality.

In embodiments, if a model of the edge device detects/classifies a suspect person, then a rule(s) may cause a high (but lower than the highest) definition video stream to be transmitted from the edge device to the ABM service via the wireless infrastructure. For example, as described herein, in response to the detection, the edge client/model may send an indication (e.g., communicate 302) to cause the ABM service to configure one or more resources of the wireless infrastructure and/or provider network to process the upcoming data stream according to the high definition quality (e.g., lower definition than the higher definition used for detection of the weapon).

If a model of the edge device detects/classifies an animal, then a rule(s) may cause a lower definition video stream to be transmitted from the edge device to the ABM service via the wireless infrastructure. For example, as described herein, in response to the detection, the edge client/model may send an indication (e.g., communicate 302) to cause the ABM service to configure one or more resources of the wireless infrastructure and/or provider network to process the upcoming data stream according to the lower definition quality (e.g., lower definition than the high definition used for detection of the suspect person).

In some embodiments, if a model of the edge device detects/classifies a change in sunlight/clouds, blowing leaves, or other non-interesting movement, then a rule(s) may prevent any video stream from being transmitted from the edge device to the ABM service via the wireless infrastructure (reducing unnecessary resource usage).

As depicted, the wireless infrastructure may include any number of resources/services, such as analytics, policy management, subscriber management, exposure functions, slicing management, mobility management, gateway control plane, core user-plane, and resources/service on the MEC networks. A shown, the ABM service may send a configuration request (e.g., via an interface) to the analytics, policy management, subscriber management, or exposure functions. However, in various embodiments, the ABM service may send a configuration request (e.g., via an interface) to any of the above resources/services based on the indication from the edge device, as described herein.

Also depicted in the example embodiment are pathways for data plane/user plane traffic (e.g., for sending the data/video/audio stream via the wireless infrastructure) as well as control plane/signaling traffic (e.g., for sending other control signals between the provider network/wireless infrastructure and between the MECs/wireless infrastructure). As shown, some or all of a given data stream may be transmitted from the edge device to an LTE radio network and then to the provider network via the core user-plane. Some or all of a given data stream may be transmitted from the edge device to an LTE radio network and then to the provider network via an MEC. Some or all of a given data stream may be transmitted from the edge device to a 5G NR radio network and then to the provider network via an MEC. In various embodiments, any other suitable pathways through a wireless infrastructure may be used to transmit a given data stream from an edge device/data source to the provider network via the wireless infrastructure.

Examples of different 4G network functions and different 5G network functions are shown as part of different resources/services of the wireless infrastructure. However, in various embodiments, any of the resources/services may include any other number/type of functions that may be used to process data streams/data transmissions. In embodiments, the wireless infrastructure may include any other number of resources/services to process data streams/data transmissions.

Figure 4:
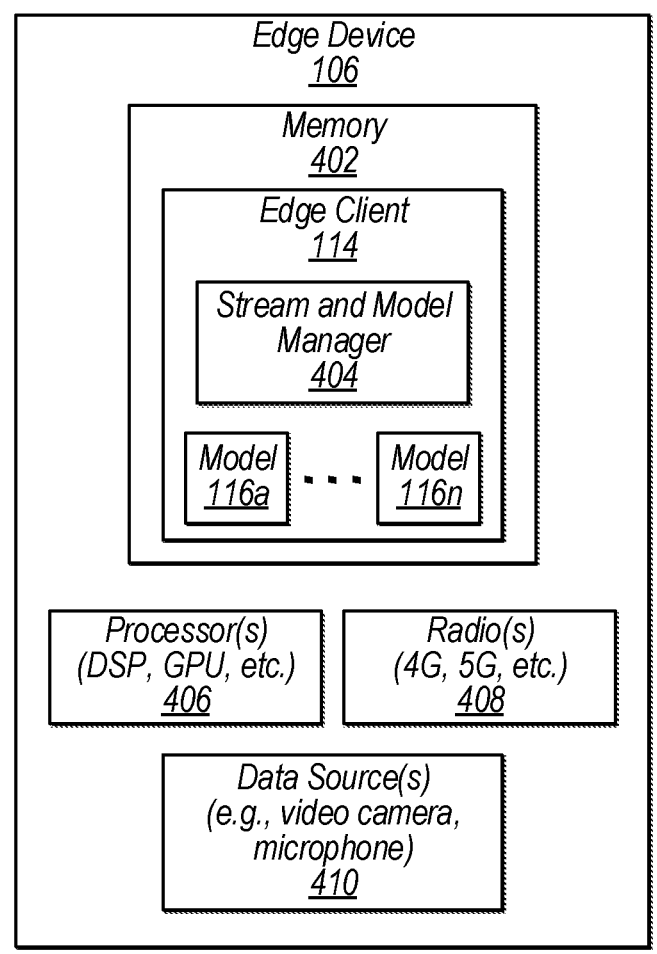
FIG. 4 is a logical block diagram illustrating an edge device that is used for edge intelligence-based resource modification to transmit data streams to a provider network, according to some embodiments.

FIG. 4 is a logical block diagram illustrating an edge device that is used for edge intelligence-based resource modification to transmit data streams to a provider network, according to some embodiments.

In the example embodiment, the edge device 106 includes a memory (e.g., an operating memory) that implements the edge client 114 and one or more models 116. The memory also implements a stream and model manager 404. The stream and model manager 404 may perform any of the functions described herein for the edge device, such as generating and/or sending an indication to the provider network, downloading and installing models from the provider network, and/or sending to the provider network configuration/information associated with the edge device.

The edge device also includes one or more processors 406 (e.g., DSP, GPU) and one or more radios 408 (e.g., 4G radio, 5G radio, etc.) to communicate with the wireless infrastructure. The edge device also includes (and/or is communicatively coupled to) one or more data sources 410.

Figure 5:
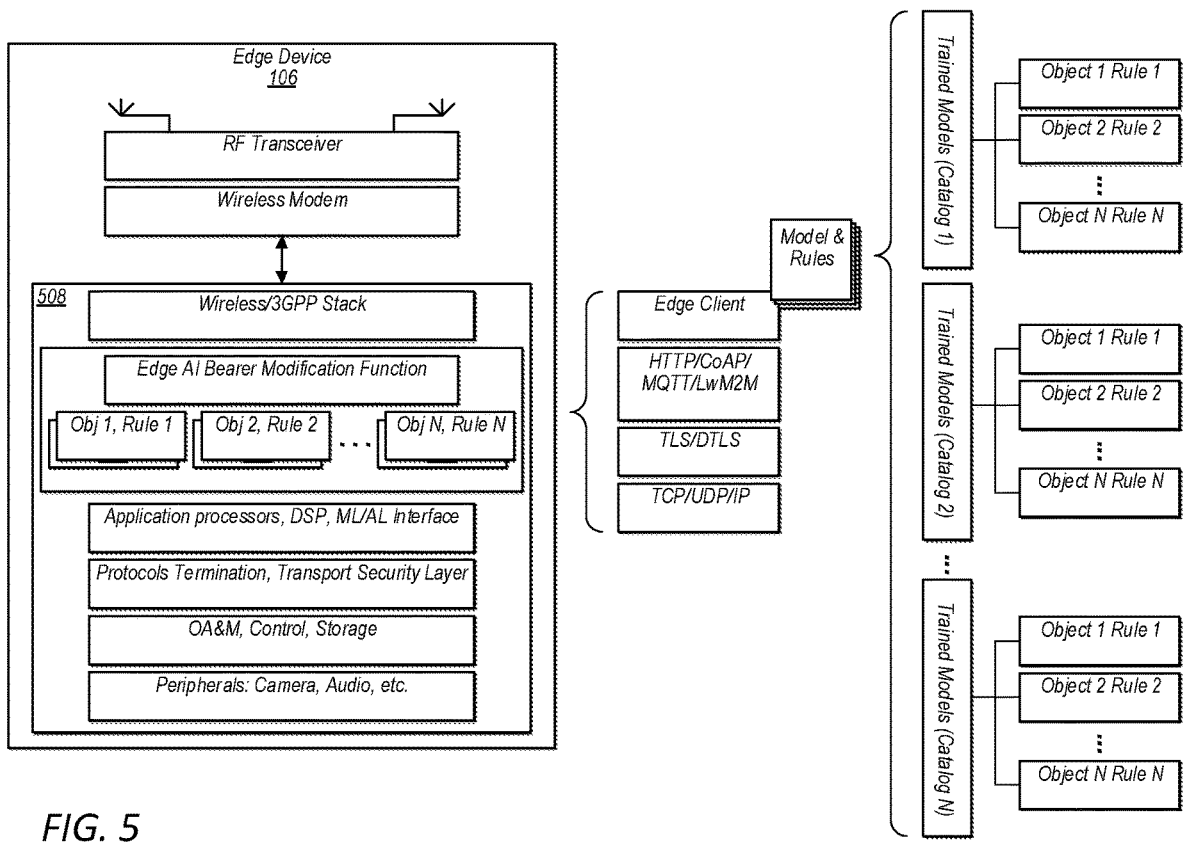
FIG. 5 is a logical block diagram illustrating an edge device that is used for edge intelligence-based resource modification to transmit data streams to a provider network, according to some embodiments.

FIG. 5 is a logical block diagram illustrating an edge device that is used for edge intelligence-based resource modification to transmit data streams to a provider network, according to some embodiments.

In the example embodiment, an edge device includes an RF transceiver and a wireless modem that communicates with an edge AI bearer modification function (ABM function) via a wireless/3GPP stack. As shown, the ABM function may include any number of trained models from any number of catalogs. Each model may implement rules for objects. For example, if a model detects a cat in video data, then the rule may be to not transmit any video stream to the provider network (or to transmit a lower quality stream). If the model detects a suspect person in video data, then the rule may be to transmit a video stream to the provider network using a higher quality stream (or highest available quality stream). As shown, the ABM function may include the edge client as well as any number of communication protocols/software, such as HTTP/CoAP/MQTT/LwM2M, TLS/DTLS, and TCP/UDP/IP.

As shown, the edge device may include application processors, DSPs, an ML/AL interface, and may implement various protocols termination and a transport security layer. The edge device may also include OA&M, control, storage, and various peripherals (e.g., cameras, audio sensors (microphones), etc.).

Figure 6:
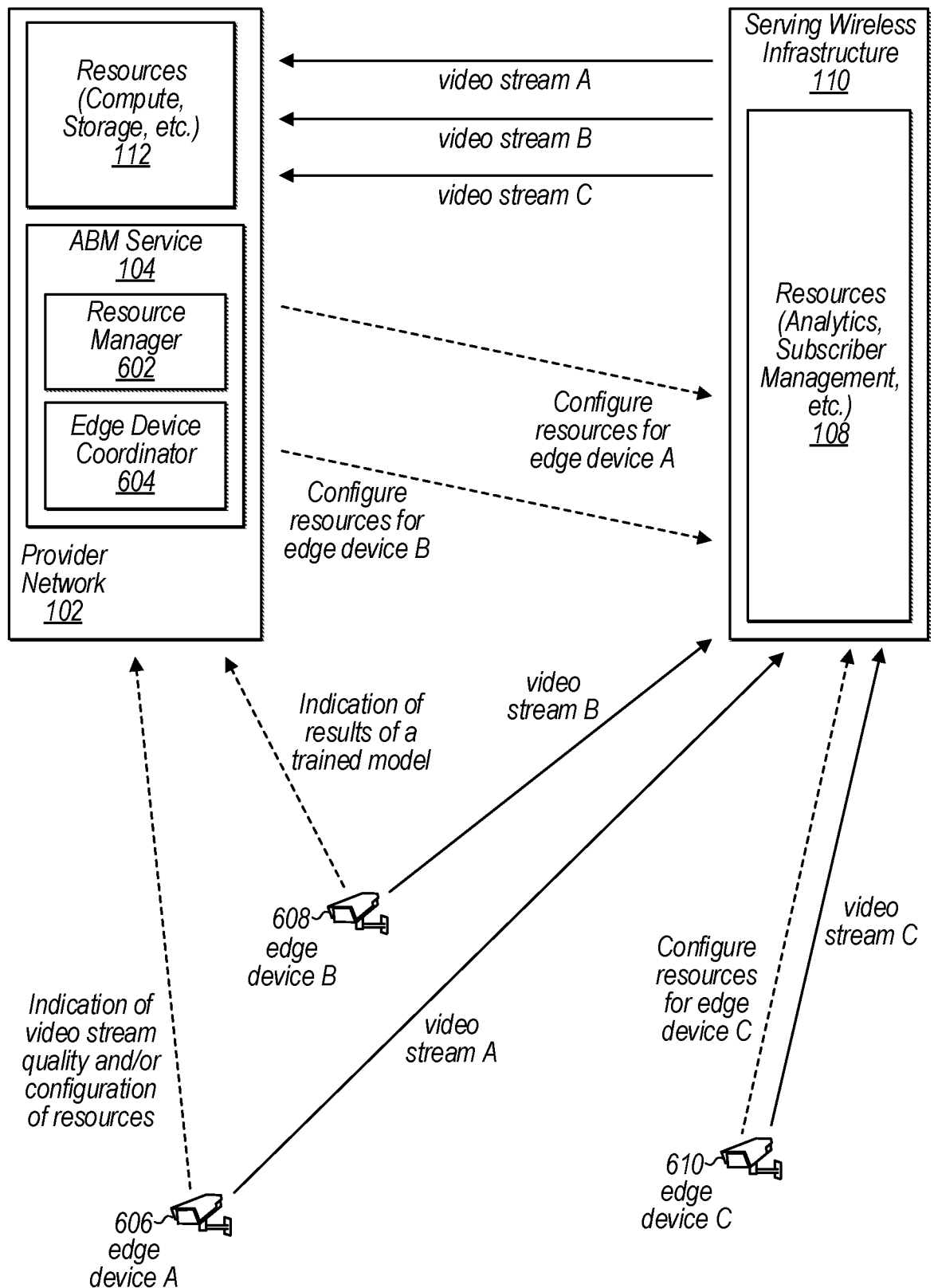
FIG. 6 is a logical block diagram illustrating a system for edge intelligence-based resource modification for transmitting data streams to a provider network, according to some embodiments.

FIG. 6 is a logical block diagram illustrating a system for edge intelligence-based resource modification for transmitting data streams to a provider network, according to some embodiments.

In the depicted embodiment, an ABM service 104 of a provider network 102 includes a resource manager 602 and an edge device coordinator 604. Edge device A 606 may send, to the ABM service, an indication of a quality of upcoming video stream A and/or a configuration of one or more resources (e.g., of the wireless infrastructure 110 and/or provider network 102) based on a result of a model, as described herein. Edge device B 608 may send, to the ABM service, an indication of results of a trained model, as described herein. As described above, the ABM service may configure one or more resources (e.g., of the wireless infrastructure 110 and/or provider network 102) based on the received indication from edge device A and edge device B.

In some embodiments, edge device C 610 may send an indication of a quality of upcoming video stream C and/or of a configuration of one or more resources the wireless infrastructure 110 based on a result of a model at edge device C (instead of sending the indication to the ABM service, as described above). This may allow resources at the wireless infrastructure to be configured faster (based on the indication of the quality of upcoming video stream C and/or of the configuration of resources), when the edge device has permission and/or the capability to do so. In such embodiments, edge device C may also send, to the ABM service, an indication of a configuration of one or more resources of the provider network. As described herein, this allows the ABM service to configure the one or more resources of the provider network to process upcoming video stream C. In the example embodiment edge device A, B and C may each include and/or be communicatively coupled to a video camera.

In some embodiments, the ABM service may manage/coordinate (e.g., using the edge device coordinator 604) any number of edge devices to track a moving subject/object more efficiently and with faster response to stream videos. For example, based on receiving from edge device A an indication based on a result generated by a trained model at edge device A, the ABM service may send, to an interface of the serving wireless infrastructure, a request to configure one or more resources of the serving wireless infrastructure on behalf of edge device A in order to transmit data stream A from a data source of edge device A to the provider network via the serving wireless infrastructure.

In response to receiving the indication from edge device A, the ABM service may also identify, based on the indication received from edge device A, one or more additional edge devices (edge device B and C) that are each expected to provide an additional data stream related to the data stream (e.g., due to a determination by the ABM service that edge devices B and C are within a threshold distance of edge device A and/or share a geographical area with edge device A and/or edge device B and C are in a direction of movement of an object detected by edge device A and are therefore expected to detect the same moving subject/object at a nearby future time period.

In response to the identification of edge devices B and C as devices that are expected to provide an additional data stream related to the data stream provided by edge device A, the ABM service may send, to the interface of the serving wireless infrastructure, one or more additional requests to configure one or more resources of the serving wireless infrastructure on behalf edge devices B and C in order to transmit one or more additional upcoming data streams from one or more additional data sources of edge devices B and C to the provider network via the serving wireless infrastructure. In embodiments, the ABM service may send the requests to configure the one or more resources of the serving wireless infrastructure on behalf edge devices B and C according to the same video quality and/or same configuration as was indicated for the request that was sent on behalf of edge device A. This may allow an ABM service to coordinate any number of data sources (e.g., video cameras at traffic lights or intersections) to more accurately track a moving object (e.g., a high speed moving object).

In some embodiments, a given edge device/data source may send different data streams to the provider network via any number of different serving wireless infrastructures. For example, after transmitting a data stream to the provider network via a particular serving wireless infrastructure (e.g., telco operator network) based on a result of a trained model, the ABM service may receive another indication based on another result generated by the trained model. Based on the other indication received from the edge device, the ABM service may send, to an interface of another serving wireless infrastructure (e.g., a different telco operator network), a request to configure one or more resources of the other serving wireless infrastructure on behalf of the edge device in order to transmit another data stream from the data source to the provider network via the other serving wireless infrastructure. The above process may be performed any number of times for any number of different serving wireless infrastructures. In embodiments, this may allow the ABM service to continue to receive video streams from an edge device (e.g., high-priority streams), even if one or more telco operator networks becomes unavailable.

Figure 7:
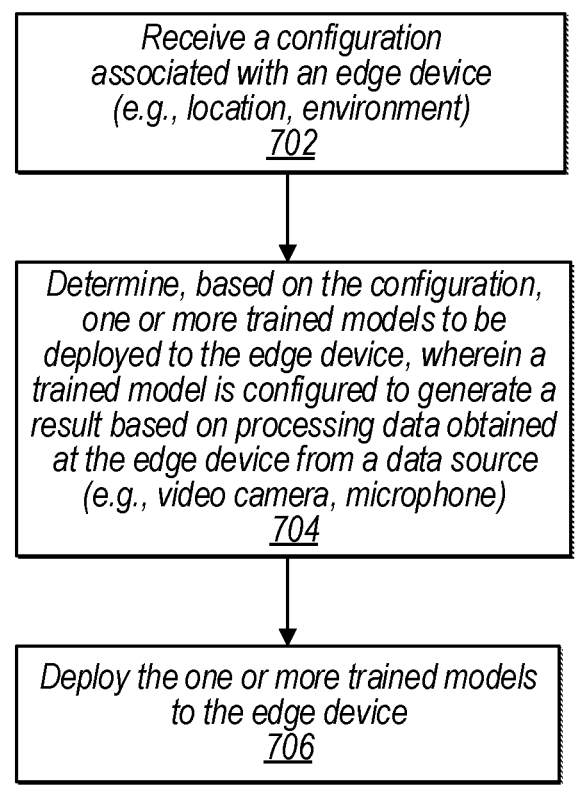
FIG. 7 is a high-level flowchart illustrating various methods and techniques to implement model deployment for a system for edge intelligence-based resource modification to transmit data streams to a provider network, according to some embodiments.

FIG. 7 is a high-level flowchart illustrating various methods and techniques to implement model deployment for a system for edge intelligence-based resource modification to transmit data streams to a provider network, according to some embodiments. These techniques, as well as the techniques discussed with regard to FIGS. 8-10, may be implemented using components or systems as described above with regard to FIGS. 1-6, as well as other types of components or systems, and thus the following discussion is not intended to be limiting as to the other types of systems that may implement the described techniques.

As indicated at block 702, an ABM service receives a configuration of an edge device (e.g., type of edge device/data source or environmental conditions such as lighting/weather/time of day). In embodiments, the configuration may be received from an administrator user via a user interface to the ABM service. In some embodiments, the configuration may be received from the edge device.

At block 704, the ABM service determine, based on the configuration, one or more trained models to be deployed to the edge device that are compatible with the configuration (e.g., with the type of edge device/data source or environmental conditions such as lighting/weather/time of day). A given trained model may be configured to generate a result based on processing data obtained at the edge device from a data source (e.g., video camera, microphone). At block 706, the ABM service deploys the one or more trained models to the edge device, where they are installed and used.

In some embodiments, the ABM service may subsequently determine (via the an indication from the user interface or an indication directly from the device) one or more changes of a configuration of the edge device (e.g., change in the lighting conditions at one or more video cameras that provide video data to the edge device and/or replacement of one or more video cameras that provide video data to the edge device with one or more different types of cameras with different capabilities). In response, the ABM service may determine, based on the received indication, a different trained model that is configured for the changed configuration/environment and deploy the different trained model to the edge device. The edge device may install and use it.

Figure 8:
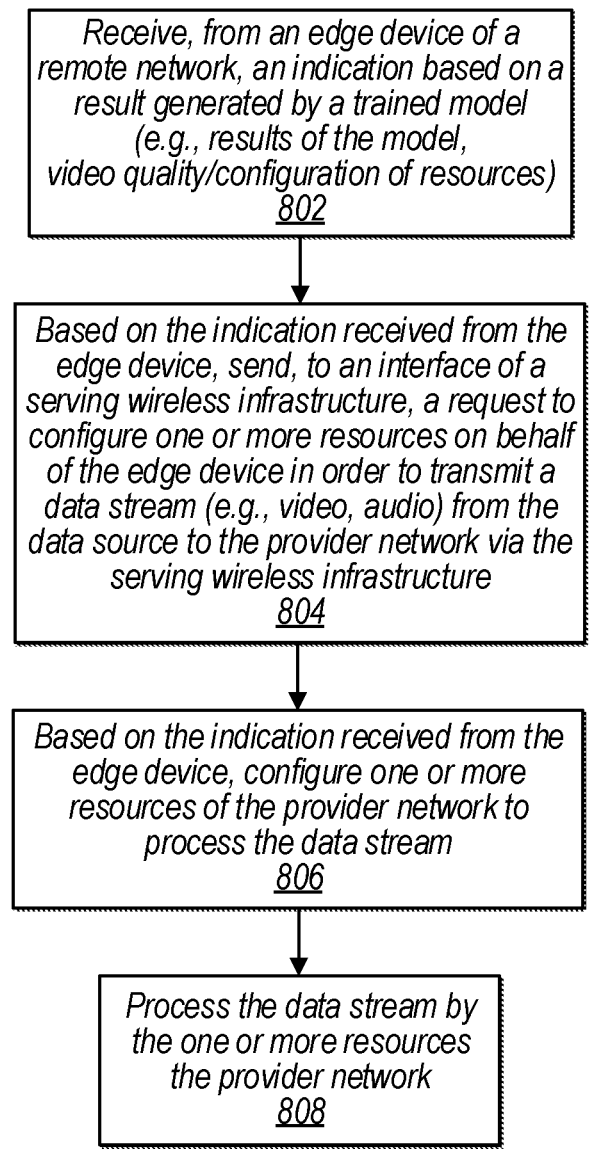
FIG. 8 is a high-level flowchart illustrating various methods and techniques to implement a system for edge intelligence-based resource modification for transmitting data streams to a provider network, according to some embodiments.

FIG. 8 is a high-level flowchart illustrating various methods and techniques to implement a system for edge intelligence-based resource modification for transmitting data streams to a provider network, according to some embodiments.

At block 802, the ABM service receives, from an edge device of a remote network, an indication based on a result generated by a trained model (e.g., results of the model, video quality/configuration of resources). At block 804, based on the indication received from the edge device, the ABM service sends, to an interface of a serving wireless infrastructure, a request to configure one or more resources on behalf of the edge device in order to transmit a data stream (e.g., video, audio) from the data source to the provider network via the serving wireless infrastructure.

At block 806, based on the indication received from the edge device, the ABM service configures one or more resources of the provider network to process the data stream. At block 808, the data stream is processed by the one or more resources of the provider network.

Figure 9:
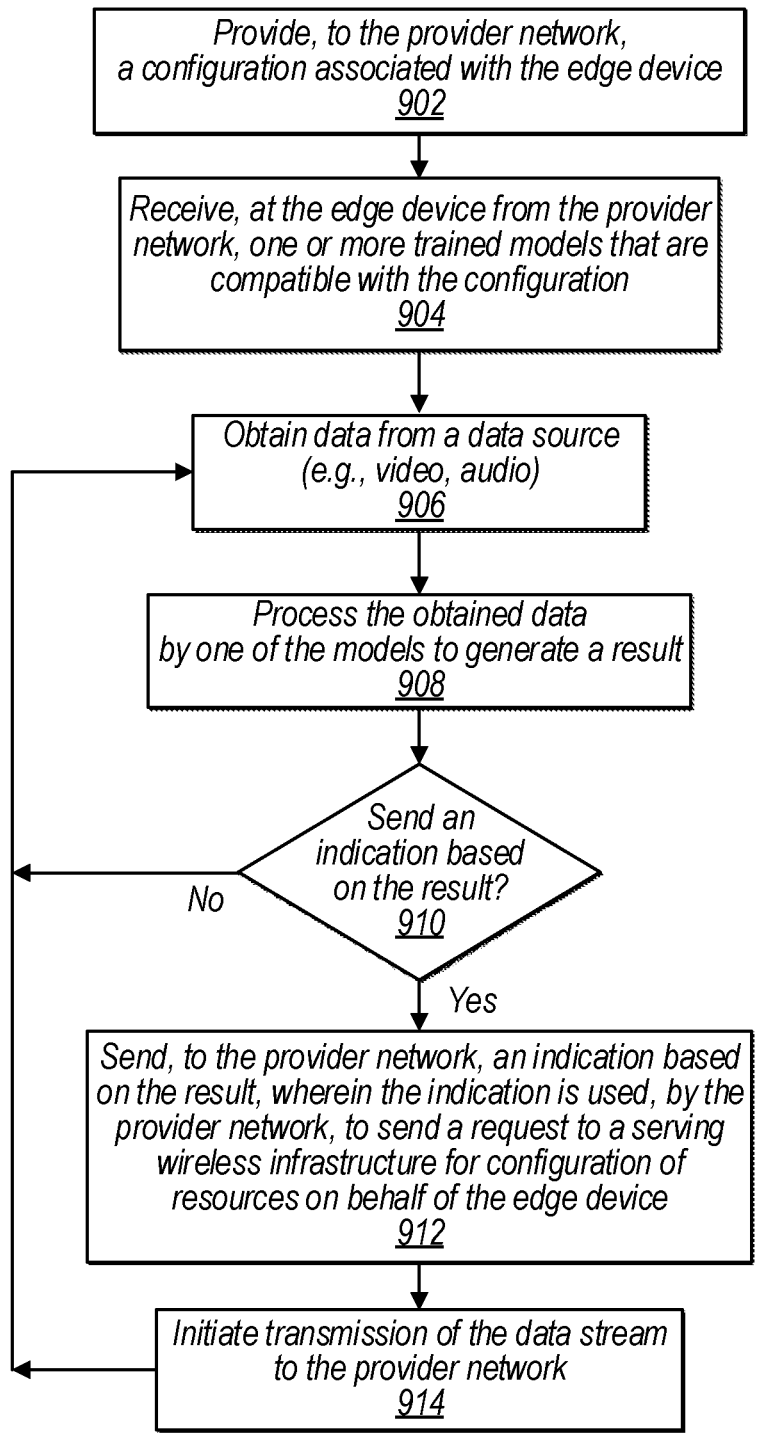
FIG. 9 is a high-level flowchart illustrating various methods and techniques to implement an edge device for edge intelligence-based resource modification to transmit data streams to a provider network, according to some embodiments.

FIG. 9 is a high-level flowchart illustrating various methods and techniques to implement an edge device for edge intelligence-based resource modification to transmit data streams to a provider network, according to some embodiments.

At block 902, an edge device provides, to the ABM service, a configuration associated with the edge device. As discussed herein, in some embodiments, the configuration may instead by provided by a user via a user interface. At block 904, the edge device receives, from the provider network, one or more trained models that are compatible with the configuration.

At block 906, the edge device obtains data from a data source. At block 908, the edge device processes the obtained data to generate a result. At block 910, the edge device determines whether to send an indication to the ABM service based on the result. If not, then the process returns to block 906 to process additional obtained data.

At block 910, if the edge device determines to send an indication to the ABM service based on the result, then at block 912, the edge device sends, to the provider network, an indication based on the result, wherein the indication is used, by the provider network, to send a request to a serving wireless infrastructure for configuration of resources on behalf of the edge device. At block 914, the edge device initiates transmission of the data stream to the provider network.

Figure 10:
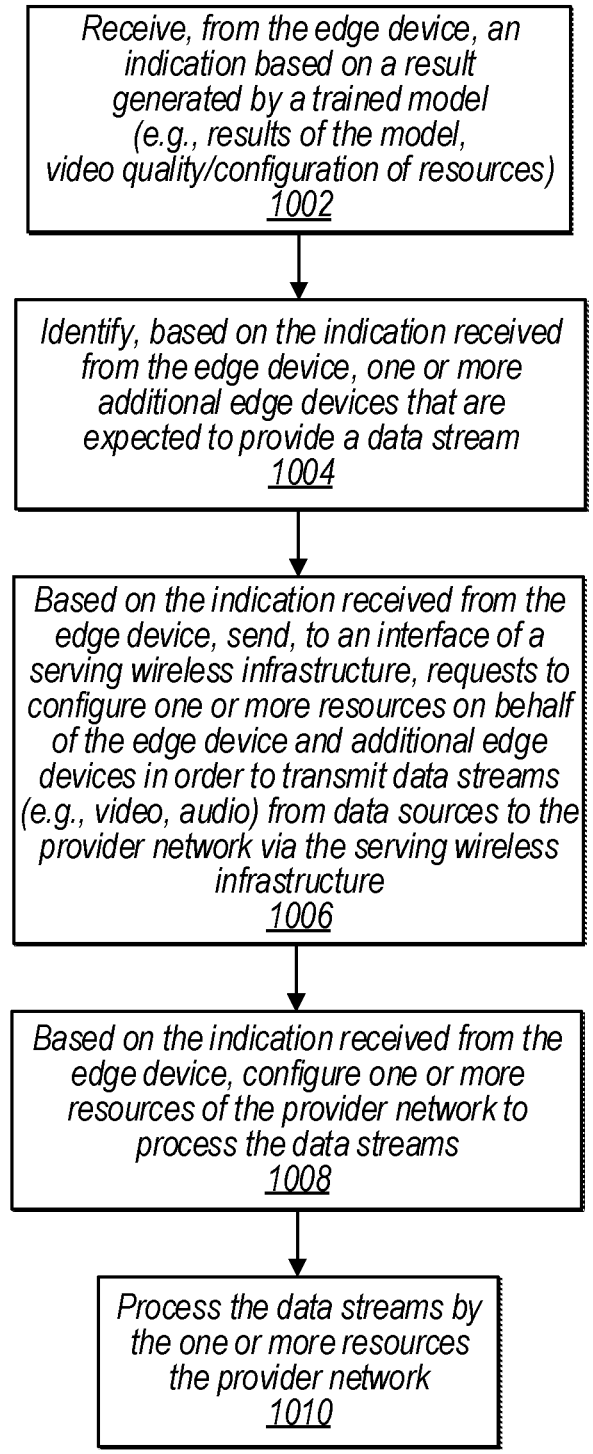
FIG. 10 is a high-level flowchart illustrating various methods and techniques to manage multiple edge devices in a system for edge intelligence-based resource modification for transmitting data streams to a provider network, according to some embodiments.

FIG. 10 is a high-level flowchart illustrating various methods and techniques to manage multiple edge devices in a system for edge intelligence-based resource modification for transmitting data streams to a provider network, according to some embodiments.

At block 1002, the ABM service receives, from the edge device, an indication based on a result generated by a trained model (e.g., results of the model, video quality/configuration of resources). At block 1004, the ABM service identifies, based on the indication received from the edge device, one or more additional edge devices that are expected to provide a data stream. At block 1006, based on the indication received from the edge device, the ABM service sends, to an interface of a serving wireless infrastructure, requests to configure one or more resources on behalf of the edge device and additional edge devices in order to transmit data streams (e.g., video, audio) from data sources to the provider network via the serving wireless infrastructure.

At block 1008, based on the indication received from the edge device, the ABM service sends, configures one or more resources of the provider network to process the data streams. At block 1010, the ABM service processes the data streams by the one or more resources the provider network.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of the ABM service, edge client, models, and other components that implement the techniques described herein). The various methods as illustrated in the figures and described herein represent example embodiments of methods. The order of any method may be changed, and various elements may be added, reordered, combined, omitted, modified, etc.

Figure 11:
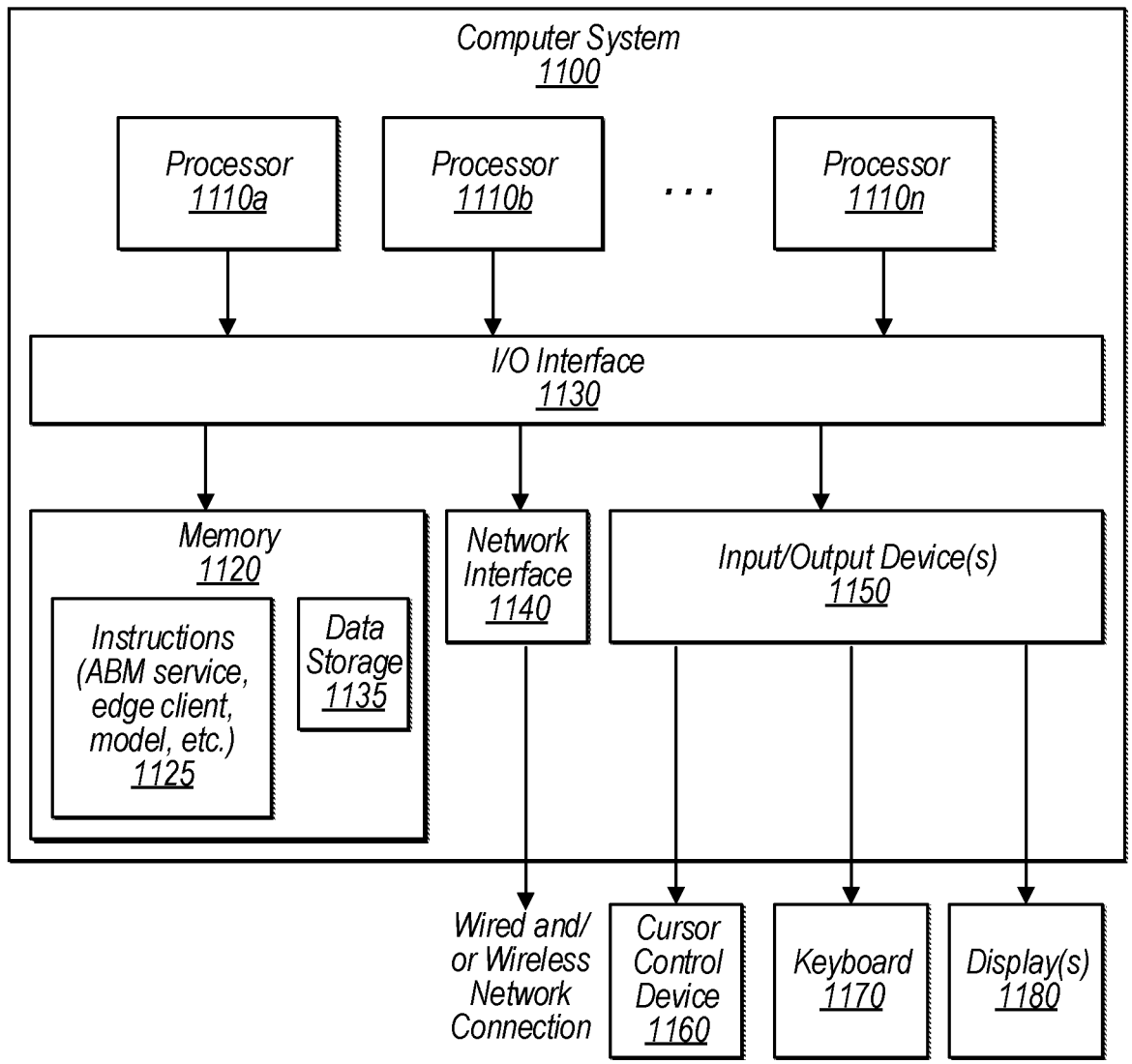
FIG. 11 is a block diagram illustrating an example computing system, according to some embodiments.

Embodiments to implement edge intelligence-based resource modification for transmitting data streams to a provider network as described herein may be executed on one or more computer systems, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the ABM service, edge client, models, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., models, data streams, indications, edge device identifiers, client identification and authentication data, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   one or more memories, wherein the one or more memories have stored thereon instructions, which when executed by the one or more processors, cause the one or more processors to implement an artificial intelligence-based modification (ABM) service of a provider network for a plurality of clients of the provider network, wherein the ABM service is configured to, for a given client:
   provide one or more trained models to an edge device of a remote network of the client, wherein a given trained model is configured to generate a given result based on processing of data obtained at the edge device from at least one data source;
   receive, from the edge device, an indication based on a result generated by one of the trained models; and
   based on the indication received from the edge device, send, to an interface of a serving wireless infrastructure, a request to configure one or more resources of the serving wireless infrastructure on behalf of the edge device in order to transmit a data stream from the data source to the provider network via the serving wireless infrastructure.

2. The system as recited in claim 1, wherein the ABM service is further configured to:
   based on the indication received from the edge device, configure one or more resources of the provider network to process the data stream.

3. The system as recited in claim 1, wherein the ABM service is further configured to:
   determine, based on the indication from the edge device, a quality of the data stream to be transmitted; and
   configure one or more resources of the provider network to process the data stream according to the determined quality.

4. The system as recited in claim 1, wherein the indication indicates one or more of:
   a quality of the data stream,
   a configuration of one or more resources of the provider network or the serving wireless infrastructure to process the data stream, or
   the result generated by the trained model.

5. The system as recited in claim 1, wherein the ABM service is further configured to:
receive, from the edge device, another indication based on another result generated by the trained model; and
based on the indication received from the edge device, send, to an interface of another serving wireless infrastructure, a request to configure one or more resources of the other serving wireless infrastructure on behalf of the edge device in order to transmit another data stream from the data source to the provider network via the other serving wireless infrastructure.

6. A method, comprising:
performing, by one or more computing devices of a provider network:
providing a trained model to an edge device of a remote network, wherein the trained model is configured to generate a given result based on processing of data obtained at the edge device from at least one data source;
receiving, from the edge device, an indication based on a result generated by the trained model; and
based on the indication received from the edge device, send, to an interface of a serving wireless infrastructure, a request to configure one or more resources of the serving wireless infrastructure on behalf of the edge device in order to transmit a data stream from the data source to the provider network via the serving wireless infrastructure.

7. The method as recited in claim 6, further comprising:
based on the indication received from the edge device, configuring one or more resources of the provider network to process the data stream.

8. The method as recited in claim 6, further comprising:
determining, based on the indication from the edge device, a quality of the data stream to be transmitted;
configuring one or more resources of the provider network to process the data stream according to the determined quality; and
sending another indication to the edge device or the data source, wherein the other indication causes the data source to transmit the data stream according to the determined quality.

9. The method as recited in claim 6, wherein the indication indicates one or more of:
a quality of the data stream,
a configuration of one or more resources of the provider network or the serving wireless infrastructure to process the data stream, or
the result generated by the trained model.

10. The method as recited in claim 6, further comprising:
identify, based on the indication received from the edge device, one or more additional edge devices that are each expected to provide an additional data stream related to the data stream; and
send, to the interface of the serving wireless infrastructure, one or more additional requests to configure one or more resources of the serving wireless infrastructure on behalf the one or more additional edge devices in order to transmit one or more additional data streams from one or more additional data sources to the provider network via the serving wireless infrastructure.

11. The method as recited in claim 6, further comprising:
determining one or more changes of a configuration or environment of the edge device;
determining another trained model that is configured for the changed configuration or environment; and
deploying the other trained model to the edge device.

12. The method as recited in claim 6, further comprising:
receiving, from the edge device, another indication based on another result generated by the trained model; and
based on the indication received from the edge device, sending, to an interface of another serving wireless infrastructure, a request to configure one or more resources of the other serving wireless infrastructure on behalf of the edge device in order to transmit another data stream from the data source to the provider network via the other serving wireless infrastructure.

13. The method as recited in claim 6, wherein the data stream comprises video data, and further comprising:
receiving, from the edge device, another indication based on another result generated by the trained model; and
based on the other indication received from the edge device, send, to the interface of the serving wireless infrastructure, another request to release at least one of the one or more resources of the serving wireless infrastructure, wherein the at least one released resource is available to be configured for transmission of a different data stream.

14. An edge device, comprising:
one or more processors; and
one or more memories, wherein the one or more memories have stored thereon instructions, which when executed by the one or more processors, cause the one or more processors to implement an edge client, wherein the edge client is configured to:
obtain data from at least one data source;
process the obtained data by a trained model to generate a result, wherein the trained model is provided by a remote provider network;
send, to the remote provider network, an indication based on the result, wherein the indication is configured to be used, by the remote provider network, to send a request to an interface of a serving wireless infrastructure for configuration of one or more resources on behalf of the edge device in order to transmit a data stream from the data source to the provider network via the serving wireless infrastructure; and
subsequent to the configuration of the one or more resources of the serving wireless infrastructure on behalf of the edge device, initiate transmission of the data stream from the data source to the provider network via the serving wireless infrastructure.

15. The edge device as recited in claim 14, wherein the indication is configured to be used, by the remote provider network, to configure one or more resources of the provider network to process the data stream.

16. The edge device as recited in claim 14, wherein the indication indicates one or more of:
a quality of the data stream,
a configuration of one or more resources of the provider network or the serving wireless infrastructure to process the data stream, or
the result generated by the trained model.

17. The edge device as recited in claim 14, wherein the edge client is further configured to:
obtain the data from a plurality of different video cameras or microphones.

18. The edge device as recited in claim 14, wherein the edge client is further configured to:
determine one or more changes of a configuration or environment of the edge device;
send, to the provider network, an indication of the changed configuration or environment; and receive, from the provider network, another trained model, wherein the other trained model is configured for the changed configuration or environment.

19. The edge device as recited in claim 18, wherein the one or more changes comprises a change in lighting conditions at one or more video cameras that provide video data to the edge device.

20. The edge device as recited in claim 18, wherein the one or more changes comprises a replacement of one or more video cameras that provide video data to the edge device.

* * * * *